United States Patent
Abe et al.

(10) Patent No.: US 11,384,892 B2
(45) Date of Patent: Jul. 12, 2022

(54) HEAT INSULATION SHEET, HEAT INSULATION BODY USING SAME, AND PRODUCTION METHOD THEREFOR

(71) Applicant: Panasonic Intellectual Property Management Co., Ltd., Osaka (JP)

(72) Inventors: Yuuichi Abe, Hokkaido (JP); Chihiro Satou, Osaka (JP); Ryosuke Usui, Hokkaido (JP)

(73) Assignee: PANASONIC INIELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 16/769,274

(22) PCT Filed: Dec. 20, 2018

(86) PCT No.: PCT/JP2018/046904
§ 371 (c)(1),
(2) Date: Jun. 3, 2020

(87) PCT Pub. No.: WO2019/176216
PCT Pub. Date: Sep. 19, 2019

(65) Prior Publication Data
US 2020/0370701 A1   Nov. 26, 2020

(30) Foreign Application Priority Data

Mar. 14, 2018 (JP) .............................. JP2018-046178

(51) Int. Cl.
*F16L 59/02* (2006.01)
*B32B 3/30* (2006.01)
*D06M 11/79* (2006.01)

(52) U.S. Cl.
CPC ................ *F16L 59/02* (2013.01); *B32B 3/30* (2013.01); *B32B 2262/101* (2013.01); *B32B 2307/304* (2013.01); *D06M 11/79* (2013.01)

(58) Field of Classification Search
None
See application file for complete search history.

(56) References Cited

U.S. PATENT DOCUMENTS

2019/0006642 A1    1/2019    Sakaguchi et al.

FOREIGN PATENT DOCUMENTS

| JP | 2011-136859 | 7/2011 |
| JP | 2013-142298 | 7/2013 |
| WO | 2017/159527 | 9/2017 |

OTHER PUBLICATIONS

International Search Report of PCT application No. PCT/JP2018/046904 dated Jan. 29, 2019.

*Primary Examiner* — Alexander S Thomas
(74) *Attorney, Agent, or Firm* — McDermott Will & Emery LLP

(57) ABSTRACT

A heat insulation sheet includes a fiber sheet having spaces therein and a silica xerogel held in the spaces of the fiber sheet. The heat insulation sheet includes a thick region and a low compressible region thinner than the thick region. A compressibility of the low compressible region is equal to smaller than 5% upon having a pressure of 0.7 MPa applied to the low compressible region. This heat insulation sheet is superior in electrical insulation properties and thermal insulation properties, and secures a predetermined distance even in a case that the heat insulation sheet receives pressures from the both sides thereof, thus providing equipment with reliability.

6 Claims, 6 Drawing Sheets

US 11,384,892 B2

HEAT INSULATION SHEET, HEAT INSULATION BODY USING SAME, AND PRODUCTION METHOD THEREFOR

CROSS-REFERENCE TO RELATED APPLICATIONS

This application is a U.S. national stage application of the PCT international application No.PCT/JP2018/046904 filed on Dec. 20, 2018, which claims the benefit of foreign priority of Japanese patent application No. 2018-046178 filed on Mar. 14, 2018, the contents all of which are incorporated herein by reference.

TECHNICAL FIELD

The present invention relates to a heat insulation sheet for heat insulation, a heat insulator including the heat insulation sheet, and a method of producing the heat insulation sheet.

BACKGROUND ART

Heat insulation have increasingly been required to improve energy efficiency of various equipment. Accordingly, various kinds of heat insulation materials are being used. A typical example of such heat insulation materials is a heat insulation sheet which contains a silica xerogel held in a glass wool, a urethane foam or a non-woven cloth.

For example, PTL 1 discloses a conventional heat insulation sheet.

CITATION LIST

Patent Literature

PTL 1: Japanese Patent Laid-Open Publication No. 2011-136859

SUMMARY

A heat insulation sheet includes a fiber sheet having spaces therein and a silica xerogel held in the spaces of the fiber sheet. The heat insulation sheet includes a thick region and a low compressible region thinner than the thick region. A compressibility of the low compressible region is equal to smaller than 5% upon having a pressure of 0.7 MPa applied to the low compressible region.

This heat insulation sheet is superior in electrical insulation properties and thermal insulation properties, and secures a predetermined distance even in a case that the heat insulation sheet receives pressures from the both sides thereof, thus providing equipment with reliability.

DETAIL DESCRIPTION OF PREFERRED EMBODIMENT

Figure 1:
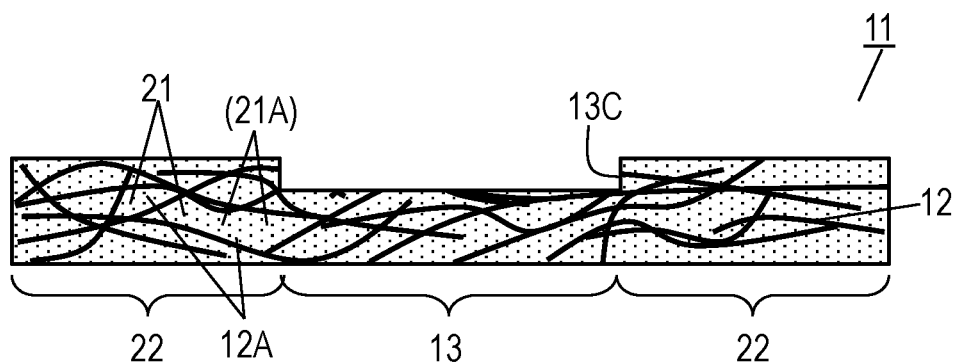
FIG. 1 is a cross-sectional view of a heat insulation sheet according to an exemplary embodiment.
Figure 2:
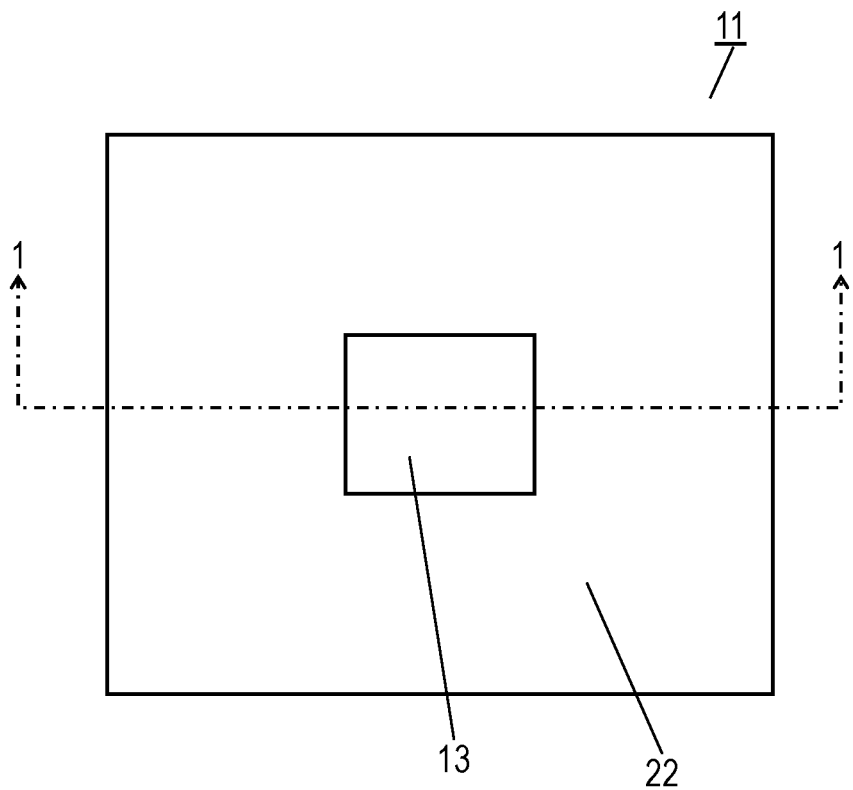
FIG. 2 is a plan view of the heat insulation sheet according to the embodiment.

FIGS. 1 and 2 are a cross-sectional view and a plan view of heat insulation sheet 11 according to an exemplary embodiment, respectively. FIG. 1 shows a cross-section of heat insulation sheet 11 along line 1-1 shown in FIG. 2.

Heat insulation sheet 11 includes fiber sheet 12 having spaces 12A therein and silica xerogel 21 is held in spaces 12A of fiber sheet 12. Fiber sheet 12 is made of glass fiber having an average fiber thickness of about 10 μm. The volume occupied by spaces 12A is about 90% of the entire volume of fiber sheet 12. Spaces 12A in fiber sheet 12 are filled with silica xerogel 21. Silica xerogel 21 has nanometer-sized pores 21A provided therein. Each pore 21A has a diameter of several nanometers. The thermal conductivity of heat insulation sheet 11 ranges from 0.018 W/m·K to 0.024 W/m·K, which is smaller than the thermal conductivity of air. The silica xerogel is a xerogel in a broad sense, or a gel in a dried state. Therefore, the silica xerogel may be obtained by not only ordinary drying, but also other drying methods such as supercritical drying and freeze-drying. In other words, silica xerogel 21 contained in heat insulation sheet 11 is a dried silica xerogel.

Heat insulation sheet 11 includes thick region 22 and low compressible region 13 connected to thick region 22. Low compressible region 13 is located at a center area of heat insulation sheet 11 and has a thickness of about 2 mm. The compressibility of low compressible region 13 is equal to or smaller than 5% upon having a pressure of 0.7 MPa is applied to low compressible region 13.

Thick region 22 has a thickness of about 3 mm. Low compressible region 13 is thinner than thick region 22.

Suppose that a thickness t0 of a sheet changes to a thickness t1 after a pressure P is once applied to the sheet and then is removed. In this case, a compressibility Pr of the sheet at the pressure P is obtained by the following formula. In accordance with the embodiment, the pressure P is 0.7 MPa.

$$Pr=(t0-t1)/t0$$

In accordance with the embodiment, the value of the compressibility Pr will be expressed in percentage.

Figure 3:
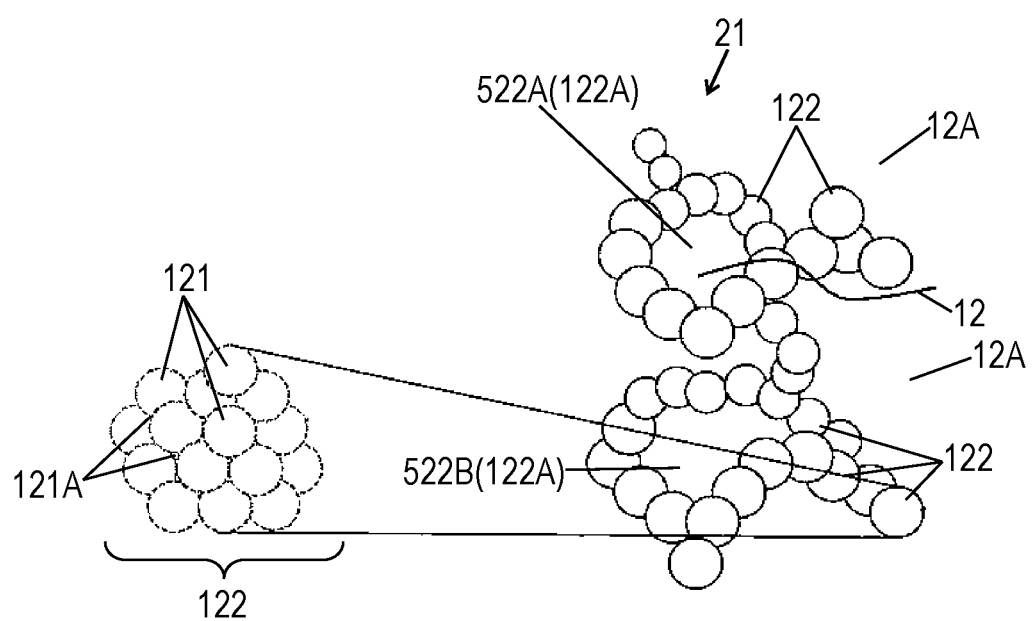
FIG. 3 is a schematic diagram of a silica xerogel in the heat insulation sheet according to the embodiment.

In heat insulation sheet 11, silica xerogel 21 having a porous structure with nanometer-sized pores is held in spaces 12A in fiber sheet 12. FIG. 3 is a schematic view of silica xerogel 21. As shown in FIG. 3, silica xerogel 21 is an aggregation of silica particles having a mesh structure in which silica primary particles 121 each having a diameter of about 1 nm are aggregated to form silica secondary particles 122 each having a diameter of about 10 nm and silica secondary particles 122 are aggregated so that pores 122A each providing interparticle distances ranging from about 10 nm to 60 nm are formed. The interparticle distances equal to or smaller than the mean free path of air provides heat insulation sheet 11 with preferable thermal insulation properties. Pores 122A formed between silica secondary particles 122 include fine pores 522A and relatively large pores 522B which are larger than pores 522A. Fine pores 121A are formed between silica primary particles 121. Fine pores 121A formed between silica primary particles 121 and fine pores 522A formed between silica secondary particles 122 are hardly crushed due to a pressure applied to heat insulation sheet 11. However, a large pressure applied to heat insulation sheet 11 causes relatively large pores 522B formed between silica secondary particles 122 to be crushed and compressed, so that heat insulation sheet 11 plastically deforms to be thinned. Since the thermal insulation properties of heat insulation sheet 11 are caused mainly by fine pores 122A and 522A, the thermal conductivity of heat insulation sheet 11 changes little even when the relatively large pores 522B are crushed. As described above, pores 21A distributed in silica xerogel 21 shown in FIG. 1, which are actually configured by pores 122A, 522A and 522B, may be regarded as being mainly configured by fine pores 122A and 522A.

In heat insulation sheet 11 according to the embodiment, a pressure is locally applied to heat insulation sheet 11 to plastically deform heat insulation sheet 11, so that low compressible region 13, which is a locally thin region, is formed. Heat insulation sheet 11 has recess 13C therein formed by low compressible region 13.

Low compressible region 13 of heat insulation sheet 11 plastically deforms due to the applied pressure does not further plastically deform when a pressure equal to or smaller than the previously applied pressure is applied. Therefore, the compressibility at a part of heat insulation sheet 11 having a predetermined pressure applied thereto is controlled to be within a specific range.

Thick region 22 of heat insulation sheet 11, which is the other area than low compressible region 13, has a compressibility ranging from 10% to 30% upon a pressure of 0.7 MPa applied to low compressible region 13. Heat insulation sheet 11 has a small weight and superior thermal insulation properties. The compressibility of thick region 22 may be controlled to be within the above-mentioned range by applying a pressure to the entire heat insulation sheet 11 including thick region 22 before forming low compressible region 13.

Figure 4:
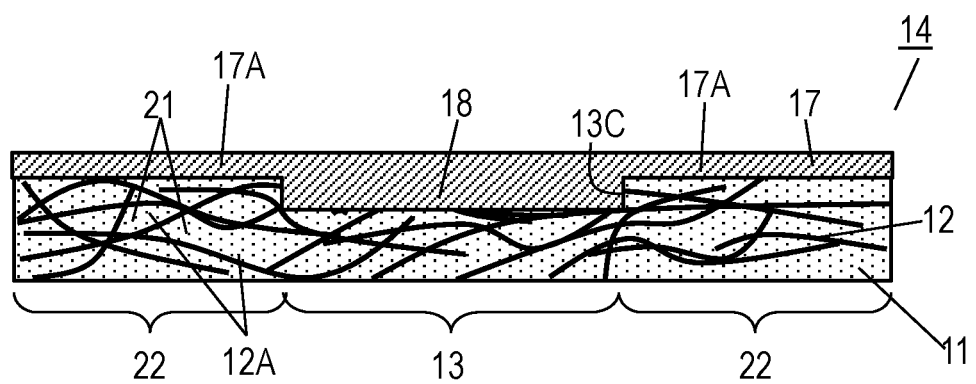
FIG. 4 is a cross-sectional view of a heat insulator according to the embodiment.

FIG. 4 is a cross-sectional view of heat insulator 14 according to the embodiment. Heat insulator 14 includes heat insulation sheet 11 and separator 17 contacting heat insulation sheet 11. Separator 17 includes substrate portion 17A and projection 18 protruding from substrate portion 17A. Projection 18 is provided at a position corresponding to low compressible region 13 of heat insulation sheet 11, so that projection 18 is located in recess 13C. After heat insulation sheet 11 is combined with separator 17, both surfaces of heat insulator 14 are substantially planar. Heat insulator 14 is placed between components expandable due to heat. In this structure, low compressible region 13 and projection 18 of separator 17 function as a supporter for preventing the entire heat insulator 14 from being compressed when the components expand. This configuration maintains the thermal insulation properties and the electrical insulation properties between the components.

Figure 5:
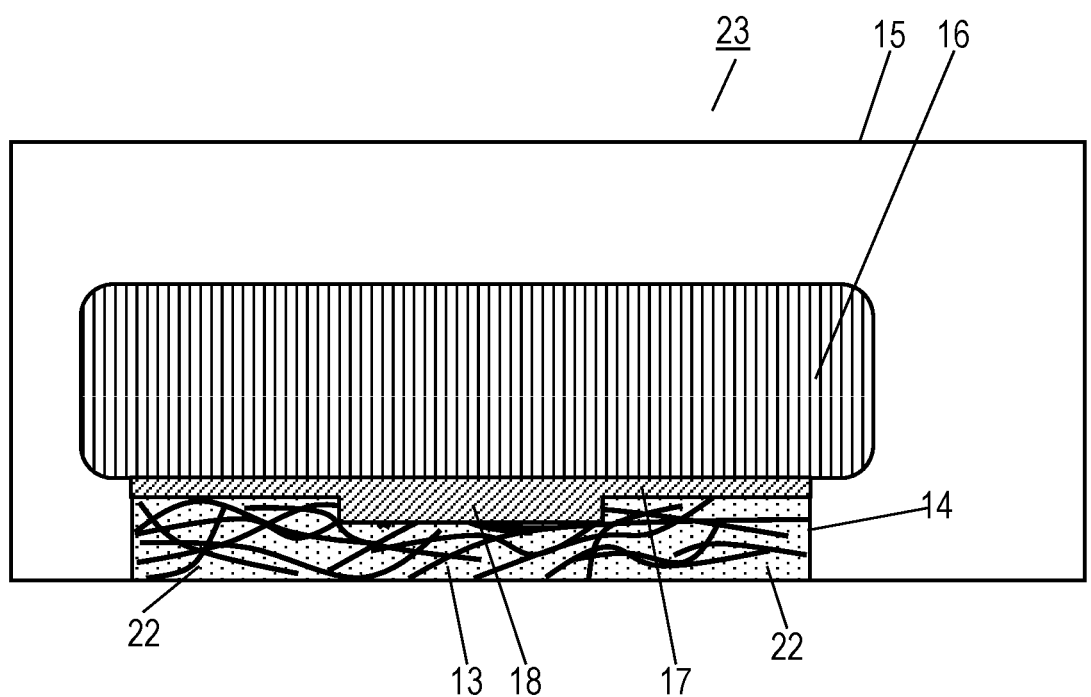
FIG. 5 is a cross-sectional view of an apparatus including the heat insulator according to the embodiment.

FIG. 5 is a cross-sectional view of apparatus 23 using heat insulator 14 according to the embodiment.

Apparatus 23 includes heat insulator 14, housing 15, and heat generating device 16. Heat generating device 16 is, for example, a motor. Heat generating device 16 is placed within housing 15. Heat generating device 16 in operation generates heat and expands. Heat insulator 14 is disposed between housing 15 and heat generating device 16.

In accordance with the embodiment, separator 17 is made of polybutylene terephthalate. Separator 17 has a thickness of about 2 mm at projection 18, and a thickness of 1 mm at substrate portion 17A, which is the portion other than projection 18. Heat insulator 14 including heat insulation sheet 11 and separator 17A has a plate shape with planar surfaces on both sides and a thickness of about 4 mm.

Heat generating device 16 in operation tends to expand most at a center area of heat generating device 16. Low compressible region 13 and projection 18 contacting the expanding portion of heat generating device 16 are compressed little even when they receive the expanding pressure. This configuration secures a predetermined distance between heat generating device 16 and housing 15 as well as to secure the electrical insulation properties.

While low compressible region 13 and thick region 22 have thermal conductivities substantially identical to each other, low compressible region 13 is thinner than thick region 22, and has smaller thermal insulation properties accordingly. Therefore, low compressible region 13 preferably occupies a relatively small proportion of area in heat insulation sheet 11. However, an excessively small proportion of area occupied by low compressible region 13 causes low compressible region 13 to be less resistant to the expansion of heat generating device 16. In view of the above, the proportion of the area occupied by low compressible region 13 in heat insulation sheet 11 is preferably equal to or larger than 5% and equal to or smaller than 30%.

A method of producing heat insulation sheet 11 and heat insulator 14 and apparatus 23 including insulation sheet 11 according to the embodiment will be described below.

First, fiber sheet 12 made of glass fibers having a thickness of about 3 mm is prepared. Then, fiber sheet 12 is immersed in sol made by adding hydrochloric acid to sodium silicate solution so that inner spaces 12A of fiber sheet 12 are impregnated with the sol. The sol entering into inner spaces 12A of fiber sheet 12 is gelated, hydrophobized and dried so as to allow inner spaces 12A of fiber sheet 12 to be filled with silica xerogel 21, thereby providing heat insulation sheet 11.

Next, a pressure is applied to a part of heat insulation sheet 11 with a die to form low compressible region 13 at the part. In this process, thick region 22 is formed in the region of heat insulation sheet 11 to which the pressure is not applied. This process provides heat insulation sheet 11 including thick region 22 and low compressible region 13 which is thinner than thick region 22 and which has a compressibility equal to or smaller than 5% upon having a pressure of 0.7 MPa applied to low compressible region 13. The pressure applied to heat insulation sheet 11 with the die may be larger than 0.7 MPa and may, for example, be 1 MPa. the pressure larger than 0.7 MPa applied to heat insulation sheet 11 provides heat insulation sheet 11, particularly low compressible region 13, with the compressibility equal to or smaller than 5% upon having the pressure of 0.7 MPa applied to low compressible region 13.

Next, separator 17 including projection 18 at a part corresponding to low compressible region 13 is formed by resin molding to produce heat insulator 14. Heat insulator 14 is disposed between heat generating device 16 and housing 15 to obtain apparatus 23.

In some kinds of apparatus provided with a heat insulator, a pressure is applied to the heat insulator. The heat insulator compressed by the pressure may cause degradation of its thermal insulation properties. Therefore, such a heat insulation sheet is required that can secure a predetermined distance and hardly causes degradation of its thermal insulation properties even when a pressure is applied to the heat insulation sheet.

Heat insulation sheet 11 according to the embodiment maintains a predetermined distance and hardly causes degradation of its thermal insulation properties even when a pressure is applied to the heat insulation sheet, as described above.

Figure 6:
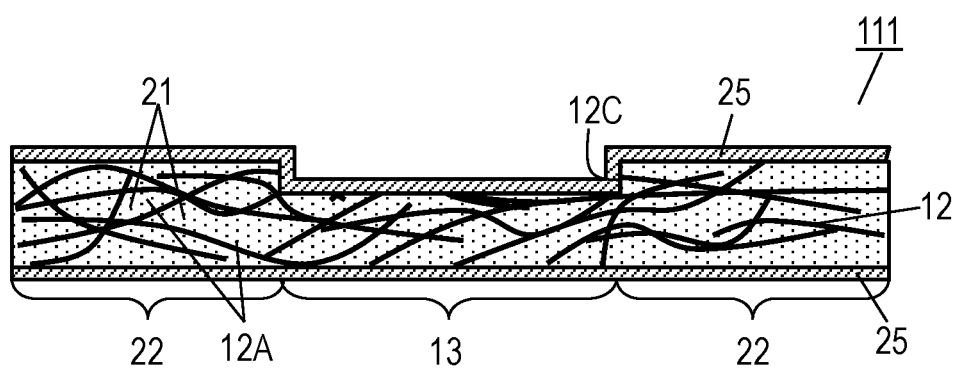
FIG. 6 is a cross-sectional view of another heat insulation sheet according to the embodiment.
Figure 7A:
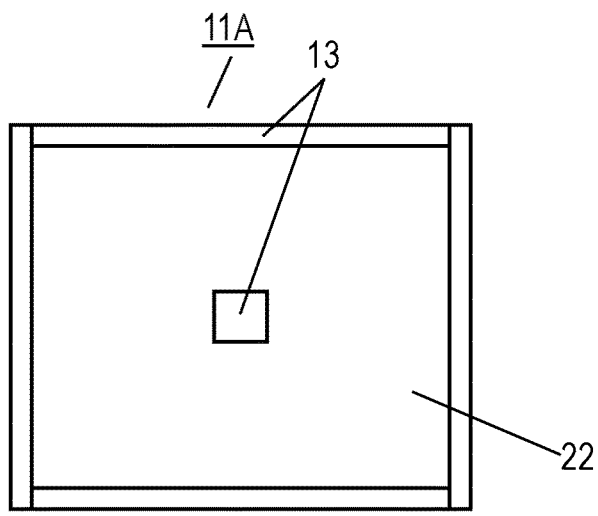
FIG. 7A is a plan view of still another heat insulation sheet according to the embodiment.
Figure 7B:
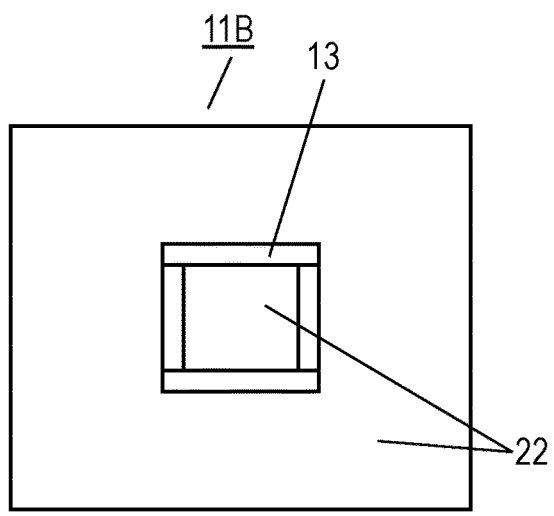
FIG. 7B is a plan view of a further heat insulation sheet according to the embodiment.
Figure 7C:
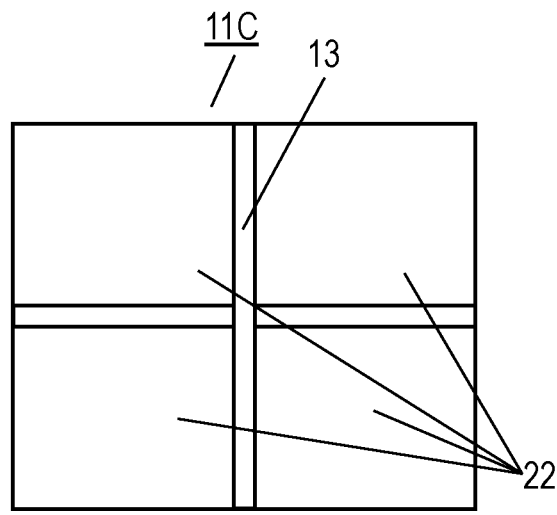
FIG. 7C is a plan view of a further heat insulation sheet according to the embodiment.
Figure 7D:
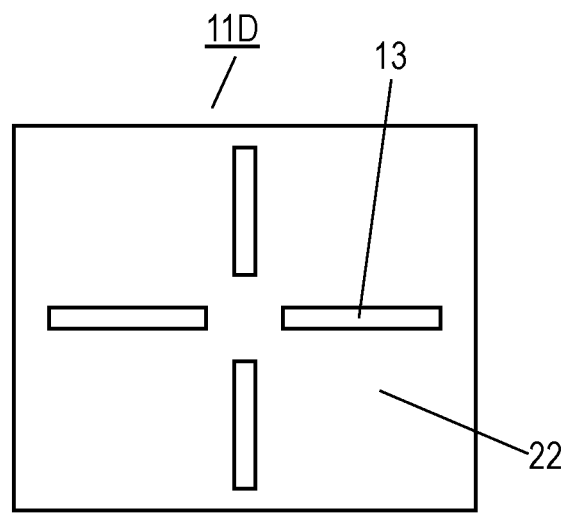
FIG. 7D is a plan view of a further heat insulation sheet according to the embodiment.

FIG. 6 is a cross-sectional view of another heat insulation sheet 111 according to the embodiment. Components identical to those of heat insulation sheet 11 shown in FIG. 2 are denoted by the same reference numerals. Heat insulation sheet 11 shown in FIG. 2 may be used as is. Heat insulation sheet 111 shown in FIG. 6 further includes protective layers 25 formed on both surfaces of fiber sheet 12. Protective layers 25 prevent silica xerogel 21 from being removed from heat insulation sheet 11. Protective layers 25 may preferably be formed after forming low compressible region 13.

While low compressible region 13 of heat insulation sheet 11 shown in FIG. 2 is provided only at the center area of heat insulation sheet 11, another low compressible region may be formed at another position. FIGS. 7A to 7D are plan views of other heat insulation sheets 11A to 11D according to the embodiment, respectively. In FIGS. 7A to 7D, components identical to those of heat insulation sheet 11 shown in FIGS. 1 and 2 are denoted by the same reference numerals. In heat insulation sheet 11A shown in FIG. 7A, low compressible regions 13 are provided at the center area and a peripheral area of the heat insulation sheet. In heat insulation sheet 11B shown in FIG. 7B, low compressible regions 13 has a ring shape surrounding thick region 22. In heat insulation sheet 11C shown in FIG. 7C, low compressible regions 13 has a cross shape. In heat insulation sheet 11D shown in FIG. 7D, plural low compressible regions 13 are separated from one another.

REFERENCE MARKS IN THE DRAWINGS 11 heat insulation sheet
12 fiber sheet
13 low compressible region
14 heat insulator
15 housing
16 heat generating device
17 separator
18 projection
21 silica xerogel
22 thick region

The invention claimed is:

1. A heat insulation sheet comprising:
a fiber sheet having spaces therein; and
a silica xerogel held in the spaces of the fiber sheet, wherein
the heat insulation sheet includes a thick region and a low compressible region thinner than the thick region, and
a compressibility of the low compressible region is equal to or smaller than 5% upon having a pressure of 0.7 MPa applied to the low compressible region.

2. The heat insulation sheet of claim 1, wherein a compressibility of the thick region is equal to or larger than 10% and equal to or smaller than 30% upon having a pressure of 0.7 MPa applied to the thick region.

3. The heat insulation sheet of claim 1, wherein the low compressible region is provided at a center area of the heat insulation sheet.

4. The heat insulation sheet of claim 3, wherein the low compressible region is provided at both of a peripheral area and the center area of the heat insulation sheet.

5. The heat insulation sheet of claim 1, wherein a proportion of an area occupied by the low compressible region in the fiber sheet is equal to or larger than 5% and equal to or smaller than 30%.

6. A heat insulator comprising:
the heat insulation sheet of claim 1, and
a separator joined to contacting the heat insulation sheet, wherein
the heat insulation sheet has a recess provided in the low compressive region, and
the separator has a projection located in the recess of the heat insulation sheet.

* * * * *